United States Patent [19]

Fiessinger

[11] 4,051,028

[45] Sept. 27, 1977

[54] PROCESS FOR PURIFYING WATER

[75] Inventor: Francois Marie Fiessinger, Paris, France

[73] Assignee: Degremont, Rueil-Malmaison, France

[21] Appl. No.: 680,842

[22] Filed: Apr. 26, 1976

[30] Foreign Application Priority Data

Apr. 25, 1975 France .................................. 75.12975

[51] Int. Cl.$^2$ .............................................. C02B 1/20
[52] U.S. Cl. .......................................... 210/47; 210/52; 252/175; 423/629
[58] Field of Search .................... 210/42, 47, 51, 52, 210/53, 59; 252/175, 182, 184, 317; 423/625, 629

[56] References Cited

U.S. PATENT DOCUMENTS

| | | | |
|---|---|---|---|
| 2,866,759 | 12/1958 | Bacon | 252/175 |
| 3,056,725 | 10/1962 | Rinse et al. | 423/629 |
| 3,066,012 | 11/1962 | Wilson et al. | 252/317 |
| 3,629,229 | 12/1971 | Schmank | 252/175 |
| 3,833,718 | 9/1974 | Reed et al. | 423/625 |

*Primary Examiner*—Wilbur L. Bascombe, Jr.
*Assistant Examiner*—Peter A. Hruskoci
*Attorney, Agent, or Firm*—Wenderoth, Lind & Ponack

[57] ABSTRACT

The invention relates to a process for the purification of water intended for human consumption or industrial use, and a process for the clarification of urban or industrial waste water, by means of a solution of a polymeric aluminum hydroxide which is prepared immediately before its use by adding an alkaline or alkaline-earth hydroxide to an aluminum salt. The conditions of preparation are chosen so as to prevent the formation of monomeric aluminum hydroxide.

7 Claims, No Drawings

PROCESS FOR PURIFYING WATER

In the clarification of water there have already been used different types of coagulating and flocculating products, aluminum sulphate, ferric chloride etc., and more particularly basic metal salts based on aluminum chloride such as those described in U.S. Pat. Nos. 2,196,016, 2,858,269 and 3,270,001. However, these basic metal salts used up to now to produce coagulation and flocculation of materials in suspension or in solution in water all contain a stabilizing agent constituted either by a divalent anion $SO_4^{--}$ etc., or by traces of organic or inorganic material intended to avoid formation of precipitates of hydroxides which no longer have any coagulating power. A coagulation and a flocculation carried out by addition of these products to water to be treated allows good removal of the cloudiness of the water but maintains in it an increased quantity of oxidizable material because of the presence of stabilizers which entails in certain cases a supplementary treatment. Their preparation is complicated and if it is desired to carry it out on site, it is incompatible with the working of a reasonable sized water treatment station.

I have now developed a process for coagulating and flocculating water which does not show these disadvantages, the reagent used being prepared on site and injected directly into the water to be treated in proportion as it is formed.

This process allows both organic and inorganic material in suspension in the water to be eliminated, and therefore the cloudiness and the oxidizable materials to be simultaneously eliminated, which makes it clean for use in drinking water. In addition, it shows other advantages: as a function of the quality of the water to be treated and following the desired efficiency, the nature of the reagent injected can be modified by adjustement of the conditions of its preparation, and that can be done in an easy manner; likewise the abundance and the depth of the floc obtained, still large and therefore advantageous in obtaining a good final clarification, are adjustable as a function of the preparation conditions of the reagent injected; finally the pH of the water being treated is only slightly modified by the coagulating reagent used. Furthermore its cost is more economical than that of the known reagents.

The invention has as its object a process for the purification of water containing dissolved and/or suspended material which comprises adding thereto a polymeric aluminum hydroxide solution prepared by treating slowly and under vigourous agitation a solution containing up to 2.5 moles/liter of an aluminum salt with a solution containing an amount of an alkaline or alkaline-earth hydroxide such that in the resulting solution the molar ratio of hydroxide to aluminum is from 2.3 to 2.7 and the concentration of aluminum is from 0.025 to 0.40 mole/liter.

The polymeric aluminum hydroxide can be represented by the general formula $Al_p(OH)_q{}^{r+}$ wherein $p$ is generally from 10 to 54 and $q$ from 30 to 150 and $r = 3p-q$, whereas polymeric aluminum hydroxide solution according to the invention can be represented in the following manner:

$n$ representing the final concentration of Al in moles/l and being a value between 0.025 and 0.040 mole/l, $m$ being the molar ratio OH/Al, Me being an alkaline or alkaline-earth cation, $v$ being the valence of Me, X being a monovalent anion, for example chlorine, and $x$ being the number of molecules of water in the solution.

The basic salts of aluminum make excellent coagulants and flocculants but if it is desired to reach the concentration and pH levels of the invention without addition of stabilisers, the products obtained are very unstable and there are formed precipitates of aluminum hydroxides which are inactive in flocculation; on the other hand the known products containing stabilisers are unsuitable if it is desired to remove oxidizable materials. The solution according to the invention which is stable for a sufficiently long time - which allows its immediate use - and which contains the greatest possible number of hydroxy-aluminum polymers ranging from $Al_{10}(OH)_{22}{}^{+8}$ to $Al_{54}(OH)_{144}{}^{+18}$ in the presence of the lowest possible quantity of $Al(OH)_3$ does not suffer from these disadvantages.

The difficulty with the preparation of such solutions (or rather "pseudo-solutions" because they often have a cloudy appearance) is the need to avoid the formation of $Al(OH)_3$, the precipitation of which is irreversible.

It is therefore expedient to control the concentrations of ingredients during the preparation of the solution, with the aim of avoiding too high concentrations and preventing formation of hydroxide.

It has been found possible under certain conditions to obtain a solution relatively concentrated in aluminum, up to $40 \times 10^{-2}$ moles, without precipitation of $Al(OH)_3$, towards pH values ranging from 4.5 to 5.5, this solution being sufficiently stable to be injected directly into the water to be treated.

Both NaOH and $Ca(OH)_2$ have been tested as supplies of $OH^-$ necessary for the formation of the hydroxymetallic polymer.

In the case that a sodium hydroxide solution is used, there is injected into the water to be treated a solution prepared on site by adding a solution of sodium hydroxide of maximum concentration 5 moles/liter to a solution of $AlCl_3$ at a rate of at least 200 ml/h. This will produce coagulation and flocculation of the materials dissolved and suspended in the water to be treated. The more concentrated the solution of NaOH is, the less quickly it is added and the more intense the agitation should be. There should be obtained a final solution of hydroxyaluminum polymer to be injected whose aluminum concentration should be included between 0.025 and 0.040 mole/l.

In the case that the solution is prepared with calcium hydroxide, a solution, a suspension or even a powder may be introduced in the solution of $AlCl_3$ at a rate of not less than 0.01 mol $OH^-$ per mole Al per minute under vigorous agitation.

With increasing rate of introduction the agitation must also be more vigorous.

The maximum rate of introduction of $Ca(OH)_2$ in powder form is 1 mole $OH^-$/mole Al/min.

The final solution must have the same concentration of aluminum as in the case that NaOH is used.

The temperature of the reaction medium is not important up to the neighbourhood of 30° C.

The injection of the solution into the water to be treated should be carried out very quickly, for example by means of a water jet pump. The more the concentration of the polymer in the solution is raised, the more rapid the mixing should be, so as to obtain an instantaneous redistribution through the whole of the water to be treated. The floc is formed very rapidly, and the mixing should be of short duration.

A comparison was made between coagulation and flocculation of a single river water carried out according to the invention and according to the known processes of addition of: $Al_2(SO_4)_3 18H_2O$ and a basic aluminum chloride stabilised by a sulphate.

The water to be treated showed the following characteristics: pH = 8, temperature = 8.31C, cloudiness = 10 JU (Jackson Units), oxidizable materials (mo) = 3.85 mg/ml, suspended material = 16 mg/ml.

The results are given in Table I.

TABLE I

| | Hydroxyaluminium polymer according to the invention | | | Basic aluminium chloride stabilised by a sulphate | | | $Al_2(SO_4)_3$ $_{18H2}O$ | | |
|---|---|---|---|---|---|---|---|---|---|
| Run No. | 1 | 2 | 3 | 1 | 2 | 3 | 1 | 2 | 3 |
| mg/l $Al_2O_3$ | 15 | 24 | 30 | 15 | 24 | 30 | 15 | 24 | 30 |
| Observed floc expressed in arbitrary units (scale from 0 to 10) | | | | | | | | | |
| after 10' | 6 | 7 | 7 | 4 | 6 | 6 | 6 | 8 | 7 |
| 20' | 7 | 8 | 9 | 6 | 7 | 7 | 7 | 9 | 7 |
| pH | 7.9 | 7.9 | 7.85 | 7.5 | 7.4 | 7.3 | 7.3 | 7.05 | 6.95 |
| Cloudiness expressed in JU after 15 minutes of settling | 0.85 | 0.77 | 0.60 | 1.1 | 0.92 | 0.72 | 1.3 | 0.85 | 1.2 |
| % of reduction MO | 49.5 | 55.8 | 58.4 | 43.6 | 50.3 | 55.7 | 45.4 | 53.2 | 57.1 |
| % volume of sediment (abundance of floc) | | | | | | | | | |
| after 5' | 5.5 | 9.0 | 9.7 | 9.5 | 9.8 | 9.9 | 3.0 | 5.2 | 6.6 |
| 10' | 3.5 | 7.5 | 9.3 | 8.9 | 9.7 | 9.8 | 2.0 | 3.2 | 4.2 |
| 15' | 3 | 7.0 | 9.0 | 6.5 | 9.5 | 9.6 | 1.7 | 2.6 | 3.3 |
| as a ratio to the volume of water | | | | | | | | | |

The invention will be further described in detail in the following Examples.

EXAMPLE 1

There is carried out according to the invention a coagulation of water from the Seine at 12° C, of cloudiness 15 JU, of pH 8.11 and whose oxidizability to $KMnO_4$ was 3.25. There were first prepared two solutions of hydroxy-aluminum polymers with the help of the same agitation system from 0.138 molar solution of soda and from a 0.5 molar solution of aluminum chloride in such a manner that the molar ratio OH/Al was maintained at 2.5; in a first run the speed of addition of the soda solution was 1 l/h, in a second run 10 l/h.

This solution was injected into the water to be treated in an amount corresponding to 48.2 mg of $AlCl_3$ $6H_2O$ per liter.

Solutions of polymeric Al-hydroxide have equally been prepared with a 0.07 molar solution of $Ca(OH)_2$ under the same conditions, and identical results were obtained.

The results obtained are shown in Table II.

The aluminum concentration in the polymer solution is given in moles/liter.

TABLE II

| Final aluminum concentration (in moles/litre) in the polymer solution | 0.05 m/l | 0.05 m/l |
|---|---|---|
| Speed of addition of the soda | 1 l/h | 10 l/h |
| Observed floc : | | |
| after 5' | 3 | 6 |
| after 10' | 3 | 7 |
| Cloudiness in JU after 30' settling | 0.8 | 0.9 |
| % reduction in oxidizability to $KMnO_4$ in acid medium | 52.3 | 47.7 |
| pH | 7.95 | 7.90 |

The "observed floc" is an arbitrary observation relating to the depth of floc obtained and ranging from 0 to 10.

The cloudiness is expressed in Jackson units.

The percentage of reduction of oxidizability to $KMnO_4$ shows the amount of oxidizable materials removed.

EXAMPLE 2

A coagulation according to the invention is carried out on Seine water having the same characteristics as those given in Example 1 by injection of solutions of hydroxy-aluminum polymers of different final Al concentrations (calculated as $AlCl_3$), namely, 0.01 m/l, 0.1 m/l and 0.5 m/l. These solutions were prepared from 0.02, 0.2 and 1 molar NaOH solutions, respectively, and 0.026, 0.5 and 2.5 molar $AlCl_3$ solutions, respectively, using the same agitation system, the same molar ratio, OH/Al = 2.5, and the same speed of addition of soda, namely 10 l/h. The water is treated with the same amount of each solution as in Example 1. The results obtained are given in Table III.

TABLE III

| Final Al concentration (in moles/litre in the polymer solution) | 0.01 | 0.1 | 0.5 |
|---|---|---|---|
| Observed floc | | | |
| after 5' | 4 | 7 | 0 |
| after 10' | 5 | 7 | 0 |
| Cloudiness after 30' of settling | 0.9 | 0.5 | 8.5 |
| % reduction of oxidizability to $KMnO_4$ in acid medium | 50.7 | 53.8 | 21.5 |
| pH | 7.96 | 7.97 | 8.03 |

Under the same working conditions the same results have been obtained with powdered $Ca(OH)_2$.

What I claim is:

1. A process for purifying water containing material dissolved and/or suspended therein, which comprises mixing the water with an effective amount of a solution of a polymeric aluminum hydroxide prepared by treating a solution containing up to 2.5 moles/liter of aluminum chloride with a solution consisting essentially of water and an alkaline or alkaline-earth hydroxide, under vigorous agitation, the resulting solution of the polymeric aluminum hydroxide having a pH of 4.5-5.5, a molar ratio of OH to aluminum of from 2.3 to 2.7 and a concentration of aluminum of from 0.025 to 0.40 mole/liter, and separating floc from the thus treated water.

2. A process according to claim 1 wherein the preparation of the polymeric aluminum hydroxide solution is carried out at the ambient temperature.

3. A process according to claim 1 wherein the polymeric aluminum hydroxide solution is prepared on the site where the water is to be treated.

4. A process according to claim 1 wherein the alkaline or alkaline-earth hydroxide is selected from the group consisting of sodium hydroxide and calcium hydroxide.

5. A process according to claim 4 wherein a solution containing up to 5 moles/liter of sodium hydroxide is introduced into an aluminum chloride solution at a rate of at least to 200 l/h.

6. A process according to claim 4 wherein the calcium hydroxide is introduced into an aluminum chloride solution at a rate of from 0.01 to 1.0 mole $OH^-$ per mole Al per minute.

7. A process for purifying water containing material dissolved and/or suspended therein, which comprises mixing the water with an effective amount of a solution of a polymeric aluminum hydroxide prepared by treating a solution containing up to 2.5 moles/liter of aluminum chloride with a substance consisting essentially of calcium hydroxide powder or a suspension of calcium hydroxide in water, under vigorous agitation, the resulting solution of the polymeric aluminum hydroxide having a pH of 4.5-5.5, a molar ratio of OH to aluminum of from 2.3 to 2.7 and a concentration of aluminum of from 0.025 to 0.40 mole/liter, and separating floc from the thus treated water.

* * * * *